Patented Jan. 6, 1953

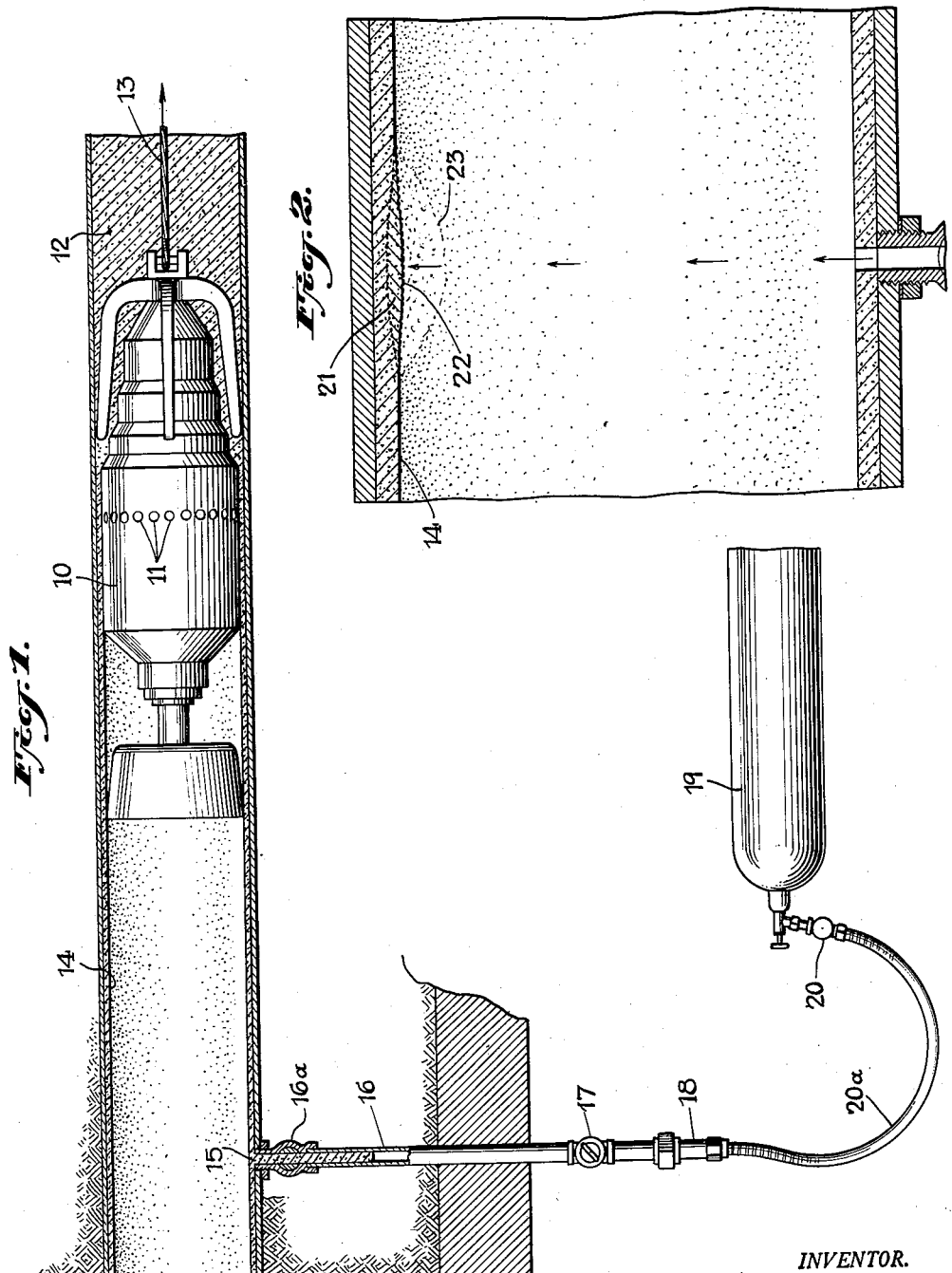

2,624,095

UNITED STATES PATENT OFFICE 2,624,095

METHOD OF LINING WITH CEMENT MORTAR UNDERGROUND CONDUITS HAVING BRANCH LINES

James P. Cummins, Scarsdale, N. Y., assignor to Centriline Corporation, New York, N. Y., a corporation of Delaware Application December 7, 1951, Serial No. 260,490

4 Claims. (Cl. 25—38)

1

This invention relates to a method for lining water pipes and other conduits which have branch connections, with cement mortar, the invention being particularly adapted for use in lining such conduits in situ underground and in a way such that the mortar used in the lining operation and which tends to flow into the branch lines, causing them to become clogged, may promptly and inexpensively be removed without digging down to each branch connection to do so and without damaging the freshly applied mortar lining in the main conduit.

One well known way of lining underground pipes with cement mortar is to drag a spreader through the pipe preceded by a mass of the cement mortar which the spreader applies under pressure against the interior walls of the pipe, thus progressively forming a mortar lining adhering to the pipe walls. One form of apparatus for performing such work is disclosed for example in U. S. Patent to Tate, Reissue No. 21,164. However, when such procedure is used in lining a pipe which has small branch connections, as the spreader approaches and passes the opening into each such connection, it will cause a quantity of the mortar to be thrust into the opening, thus blocking the branch connection for a distance at least several inches back from the main conduit. Heretofore, so far as I am aware, the only practical way for removing this mortar from the branch connections has been to dig down to the connection, uncouple same and dig out the slug of mortar which is obstructing the branch line. While this may be done before the mortar hardens, some of the mass of mortar thus removed may fall back into the main pipe onto the freshly applied lining and steps must be taken to then clean out of the pipe while avoiding disturbance of the lining mortar. And if the mortar is allowed to harden in the branch line before it is removed, then the part of the connection which contains same may have to be replaced. In any event, a substantial expense is involved in digging down to and cleaning out each such branch connection.

The present invention avoids in a simple and inexpensive way all of the above noted difficulties and in a way which eliminates digging down to each branch connection and avoids all troubles in disposing of the mortar of the slug which blocks the branch line. Briefly the method involves lining the main conduit with the mortar in such a way that after the mortar lining has acquired its "initial set", but while the slug in the branch line is still plastic or of the consistency of soft butter, such slug as a whole may be blown into the main conduit, this being accomplished by applying to some readily accessible or

2 above-ground connection to the branch line (for instance a coupling or faucet in a house basement) a source of gas or other fluid under sufficient pressure to dislodge the mortar slug and project it against the opposite inside wall of the main conduit with such force as to form a depressed area in such mortar lining. Under proper conditions this results in the surprising effect that the mortar of the slug will fairly uniformly distribute itself over the depressed area thus formed on the lining and thereby cover and fill same, the slug mortar merging with or firmly adhering to the lining mortar previously applied, thus finally leaving the lining surface areas opposite the branch line in such uniform condition as to not appreciably interfere with the proper flow coefficient of the liner conduit.

Further and more specific features of the invention will appear from the detailed description given below, taken in connection with the accompanying drawings which form a part of this specification and which illustrate the way in which the invention may be carried out.

In the drawings:

Fig. 1 is a longitudinal sectional view of a length of underground conduit in the process of being lined in accordance with the method of the invention; and Fig. 2 is a sectional view taken through a typical portion of the lined conduit at the region of a branch line from which the obstructing mortar has been blown out in accordance with the invention.

In carrying out the invention, the main conduit lining of cement mortar is first applied by any suitable method or means whereby preferably, as the lining mortar is being applied, it will be subjected to sufficient pressure to dehydrate same to a substantial degree. This may be accomplished by placing a mass of the mortar in the conduit and then, by the use of a cable, dragging a spreader through the conduit with the mortar in advance thereof, portions of the spreader preferably having perforations permittting water to escape from the mortar as it is being pressed against the interior pipe walls. Equipment such as disclosed in the above-mentioned Tate patent for instance, may be used for this purpose and such a spreader is indicated in Fig. 1 at 10, having perforations at 11. A mass of the mortar 12 is positioned in advance of the spreader and the latter is pulled through the conduit as by a cable 13. The trailing end of the spreader leaves a substantially uniform mortar lining as at 14 on the interior walls of the conduit.

As the spreader 10 is drawn from left to right (Fig. 1) and as it passes an opening as at 15 to a branch line 16, it will ordinarily cause sufficient of the mortar to travel into such opening to fill the branch line back through the usual "corporation cock" 16a and for a substantial distance, but this distance may be considerably reduced by shutting the service shut-off valve as at 17, if same is located in the branch fairly near the main conduit. That is, by shutting off such valve, the flow of mortar into the branch line will be resisted by the pressure of entrapped air in the branch. Thus the amount of mortar in the branch may usually be limited to a slug three or four inches in length. In a typical case, after the main conduit has thus been lined and the branch lines have been accordingly blocked by slugs of mortar, the partially dehydrated mortar of the lining 14 will become rather firm after a period of from one to two hours, for example, but on the other hand the slug of mortar in the branch, not having been subjected to dehydrating pressure, will be relatively softer, i. e. of about the consistency of soft rubber as above noted, although it will be in a coherent plastic condition. At this time a source of gas under pressure is connected onto the branch at some readily accessible connection, such as at a service line coupling 18 in the house cellar. The gas may comprise for example compressed air, oxygen or other gas readily available on the job and contained preferably under 80 to 90 pounds pressure in a portable storage cylinder of conventional type as at 19, having a quick acting valve 20. When, with all valves in the branch line in open condition, if valve 20 is quickly opened, the rush of gas into the branch pipe causes the mortar slug as a whole to be projected forcefully back into the main conduit. As shown in Fig. 2, the thus projected slug of mortar will cause a depression as at 21 to be formed in the mortar lining 14, which depression extends over a considerable area of the region opposite the branch connection 16, yet the mortar of the slug immediately covers and fills this depression in the manner indicated at 22, thus uniquely disposing of the slug mortar while still leaving a substantially uniform lining surface area 23, which is surprisingly free of any irregularities such as might interfere with the flow coefficient for the conduit when later in use.

The time which should elapse after the main conduit has been lined, before the blowing out of the branch line slugs should be attempted, will vary depending upon the mortar mixture being used, the weather conditions, and the "length of pull" that has been made, i. e. the length of the section of conduit being lined by pulling through the spreader. But such time can readily be determined by experience with a few connections and with the particular mortar chosen for the job. Such time should be sufficient so that the somewhat dehydrated lining in the main conduit will have had opportunity to become firm against being displaced to its full depth or knocked off from the conduit walls, and at such time, the mortar of the slug not having been subject to a dehydrating step as was the lining mortar, will be relatively soft and thus easier to dislodge and yet in a plastic condition such that it will distribute itself over the depression 21 which it forms in the lining and will adhere to and fill such depression. If it is attempted to blow out the slug while it is still too soft or relatively free-flowing, the gas may cause a central or irregular aperture to be formed therethrough without blowing the slug out substantially as a whole. But in the usual case and with the example shown, if about one to two hours is allowed to elapse after the lining operation and before the slug is blown out, then the substantially ideal condition indicated by Fig. 2 will be achieved.

I claim:

1. In the lining, in situ with cement mortar, of underground conduit having a branch pipe connection, the combination of method steps which comprises: spreading mortar under pressure onto the inside walls of the conduit to form the lining and also thereby filling the end of said connection with mortar; and then while the mortar in such connection is still in a relatively soft condition, bringing such connection into communication with a high pressure source of gas forcefully to project the mortar from the connection and distribute same onto and into the mortar lining on the opposite wall in the conduit to form a permanent part of such lining.

2. The method of lining pipes which have branch connections, with cement mortar, which comprises: first applying under pressure a coating of the mortar onto the interior walls of a length of the pipe which includes an opening to a branch connection whereby such opening also becomes filled with a slug of mortar; and thereafter blowing such slug back into the pipe and against the mortar on the wall area in the pipe opposite the opening with sufficient force to form a depressed area in the latter mortar, which depressed area becomes covered by the mortar of the slug distributed thereover.

3. In the lining, in situ with cement mortar, of conduit having a branch pipe connection, the combination of method steps which comprises: applying the mortar under pressure onto the inside walls of the conduit to form the lining and also thereby filling the end of said connection with a slug of the mortar, such pressure acting at least partially to dehydrate the motor on the conduit walls and thus to promote relatively more rapid hardening thereof than occurs in said slug; and then after the mortar of said slug has become coherent but is still in a relatively soft condition, bringing such connection into communication with a high pressure source of fluid forcefully to project said slug from the connection and distribute same onto and into the more firm mortar lining on the opposite wall in the conduit to form a permanent part of such lining.

4. In the lining, in situ with cement mortar, of underground conduit having a branch pipe connection with a shut-off valve near the conduit, the combination of method steps which comprises: closing such valve; dragging a spreader preceded by a mass of the mortar through the conduit whereby the mortar is spread under pressure as a lining in the conduit and some of the mortar fills such branch connection for a distance limited by the air pressure occurring therein by reason of such closed valve; and thereafter while the mortar in the branch connection is still in relatively soft, bringing said branch connection into communication with a source of gas under such pressure as forcefully to blow said mortar from said connection and to distribute same onto and into the mortar lining on the opopsite wall of the conduit to form a permanent part of such lining.

JAMES P. CUMMINS.

No references cited.